(12) United States Patent
Yoshida et al.

(10) Patent No.: US 6,982,750 B1
(45) Date of Patent: Jan. 3, 2006

(54) DIGITAL CAMERA WITH POWER SUPPLY FOR PIEZOELECTRIC ELEMENT AND STROBOSCOPE CIRCUIT

(75) Inventors: Akihiro Yoshida, Kanagawa (JP); Naoki Koshida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 556 days.

(21) Appl. No.: 09/677,880

(22) Filed: Oct. 3, 2000

(30) Foreign Application Priority Data

Oct. 28, 1999 (JP) .................................. 11-307635

(51) Int. Cl.
*H04N 5/225* (2006.01)

(52) U.S. Cl. ..................... 348/219.1; 348/372

(58) Field of Classification Search ............... 396/248, 396/261; 348/208.16, 333.13, 372, 219.1; 310/316.03, 311; 315/55; 382/314; 359/824
See application file for complete search history.

(56) References Cited

U.S. PATENT DOCUMENTS

| | | | | |
|---|---|---|---|---|
| 4,884,090 A | * | 11/1989 | Tanaka et al. | 396/463 |
| 5,678,106 A | * | 10/1997 | Goto et al. | 396/489 |
| 6,195,125 B1 | * | 2/2001 | Udagawa et al. | 348/222.1 |
| 6,211,910 B1 | * | 4/2001 | Kino et al. | 348/208.99 |
| 6,441,849 B1 | * | 8/2002 | Fukuda | 348/230.1 |

FOREIGN PATENT DOCUMENTS

| | | |
|---|---|---|
| JP | 5-165080 | 6/1993 |
| JP | 7-301843 | 11/1995 |

OTHER PUBLICATIONS

U.S. Appl. No. 09/677,880, filed Oct. 3, 2000, Yoshida et al.
U.S. Appl. No. 10/641,050, filed Aug. 15, 2003, Shinohara et al.
U.S. Appl. No. 10/386,568, filed Mar. 13, 2003, Yoshida et al.
U.S. Appl. No. 10/764,449, filed Jan. 27, 2004, Ojima et al.
U.S. Appl. No. 10/725,401, filed Dec. 3, 2003, Yoshida.

* cited by examiner

*Primary Examiner*—David L. Ometz
*Assistant Examiner*—Yogesh Aggarwal
(74) *Attorney, Agent, or Firm*—Oblon, Spivak, McClelland, Maier & Neustadt, P.C.

(57) ABSTRACT

To present a digital camera capable of operating a piezoelectric element without particularly preparing any boosting circuit inside the digital camera. In a digital camera for acquiring image data by taking a subject image, an imaging device for taking the subject image, and a piezoelectric element for displacing the imaging device are provided, and a main capacitor for stroboscope emission is used as the power supply source for the piezoelectric element.

12 Claims, 9 Drawing Sheets

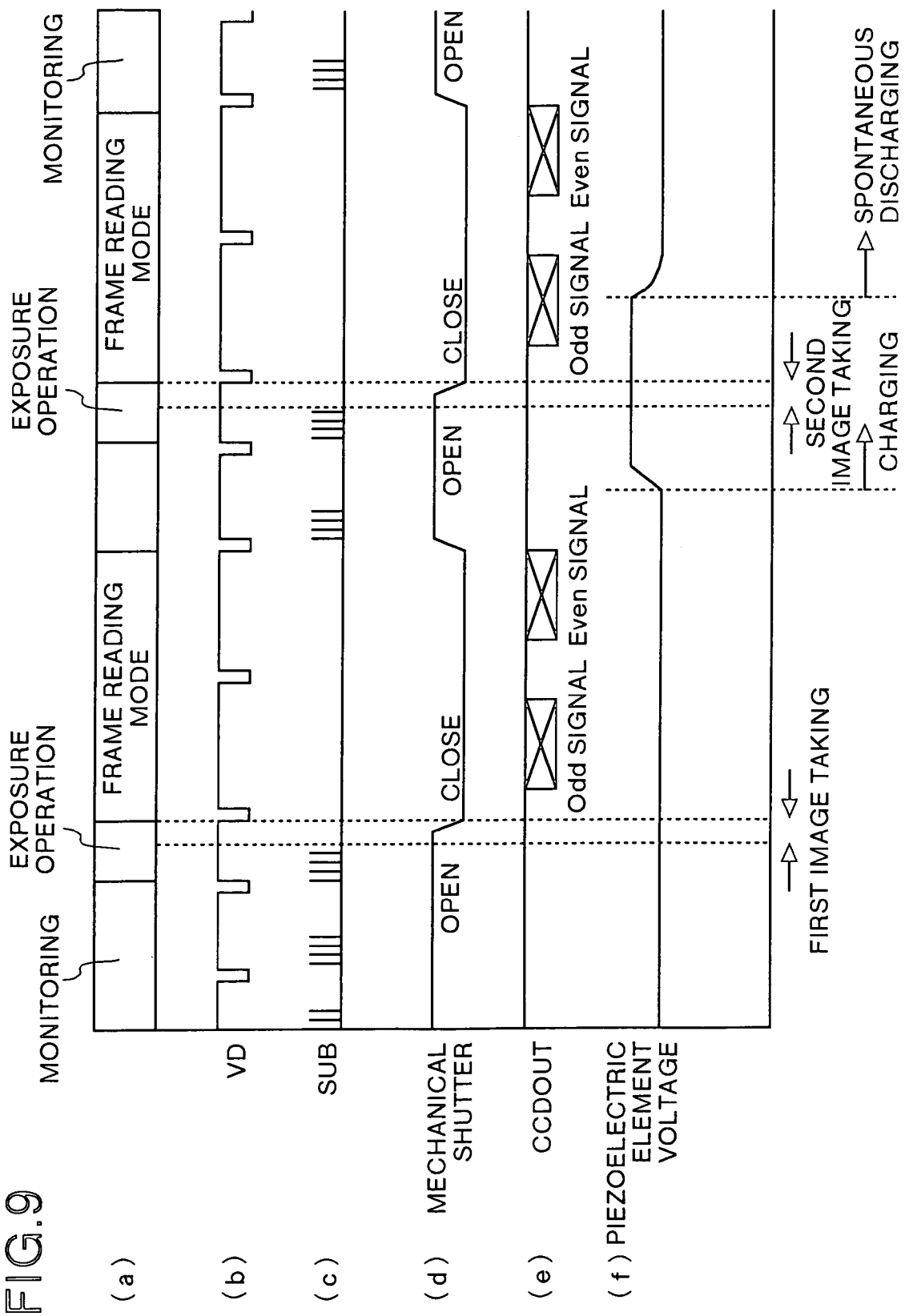

DIGITAL CAMERA WITH POWER SUPPLY FOR PIEZOELECTRIC ELEMENT AND STROBOSCOPE CIRCUIT

FIELD OF THE INVENTION

The present invention relates to a digital camera, and more particularly to a digital camera having an imaging device displaced by a piezoelectric element.

BACKGROUND OF THE INVENTION

A higher image quality is demanded in the digital camera. To obtain an image of high quality, many pixels of a solid state imaging device are set, and a longer reading time is required. Accordingly, a pixel shifting technique is proposed recently in order to obtain a higher picture quality by a smaller number of pixels.

Various techniques about power source circuit for an optical camera are disclosed. For example, a power source circuit for camera is disclosed in Japanese Laid-open Patent No. 5-165080, and in this power source circuit for camera incorporating an oscillating wave motor and a flash device, a first voltage to be applied to a piezoelectric element of the oscillating wave motor for operating the mechanism in the camera, and a second voltage for operating the flash device are changed over by an output voltage changeover circuit depending on each operation by composing a boosting circuit by using a pair of boosting transformers, a switching element, an oscillation control circuit, and an output voltage changeover circuit, and it is designed to drive an ultrasonic motor for film take-up, an ultrasonic motor for lens driving, and a stroboscope circuit.

The power source circuit for camera disclosed in Japanese Laid-open Patent No. 7-301843 comprises a stroboscope emission device for stroboscope emission, a capacitor for accumulating emission energy for emitting this stroboscope emission device, charging means for boosting the supply voltage of the battery, and charging the capacitor by the boosted voltage, an actuator provided in the camera, a drive circuit for driving the actuator, changeover means for supplying either the emission energy accumulated in the capacitor or the energy from the power source battery selectively to the actuator or the drive circuit, supply voltage detecting means for detecting the supply voltage, temperature measuring means for detecting the environmental temperature of the camera, and control means for controlling the changeover means by selecting either the capacitor or the supply voltage on the basis of the supply voltage detected by the supply voltage detecting means and the environmental temperature detected by the temperature measuring means, in which the capacitor for accumulating the stroboscope emission energy is used as the power source, and the driving source for the lens driving mechanism of camera and film feed mechanism is obtained.

However, in the power source circuit for camera disclosed in Japanese Laid-open Patent No. 5-165080, a large circuit scale is required because the output changeover function is needed in the boosting circuit. In the power source circuit for camera disclosed in Japanese Laid-open Patent No. 7-301843, only the technique of driving the lens driving mechanism of camera and the film feed mechanism is disclosed by using the capacitor for accumulating the stroboscope emission energy as the power source, and nothing is proposed about the power source technology of the piezoelectric element for displacing the imaging device.

SUMMARY OF THE INVENTION

It is an object thereof to present a digital camera capable of operating the piezoelectric element for displacing the imaging device, without requiring any particular boosting circuit in the digital camera and provides a digital camera capable of obtaining an image of high definition.

To achieve the object, according to one aspect of this invention, a digital camera for acquiring image data by taking a subject image comprises imaging device for taking a subject image, and a piezoelectric element for displacing the imaging device, in which energy accumulating means for supplying an electric power to other unit is used as an electric power supply source for the piezoelectric element.

According to another aspect of this invention, in the digital camera according to one aspect of this invention, in which the energy accumulating means is composed of a main capacitor for strobe unit emission provided inside or outside, and the piezoelectric element is charged by the energy accumulated in this main capacitor.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the control means controls to take a first image by charging the piezoelectric element in a state of displacing the imaging device, and take a second image by discharging the piezoelectric element in a state before displacement of the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the switching means includes a charge adjusting circuit for stopping the charging operation when the charged voltage in the piezoelectric element becomes a specified value to hold this charged voltage, and restarting charging operation when the charged voltage in the piezoelectric element becomes lower than a specified value, and the control means controls to take a first image by charging the piezoelectric element in a state of displacing the imaging device, and take a second image by discharging the piezoelectric element in a state before displacement of the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the switching means includes a charging switch circuit for turning on or off charging of the piezoelectric element, a discharging switch circuit for turning on or off discharging of the piezoelectric element, a detecting circuit for detecting the charged voltage in the piezoelectric element, and comparing means for comparing the charged voltage in the piezoelectric element detected by the detecting means and a reference voltage, the charging switch circuit turns on or off charging of the piezoelectric element on the basis of the result of comparison by the comparing means, and the control means controls to take a first image by charging the piezoelectric element in a state of displacing the imaging device, and take a second image by discharging the piezoelectric element in a state before displacement of the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the control means controls so as to stop the charging operation when the piezoelectric element reaches a specified voltage, and to take a first image by charging the piezoelectric element in a state of displacing the imaging device, and take a second image by discharging-the piezoelectric element in a state before displacement of the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, and also controlling to stop the charging operation when the piezoelectric element reaches a specified voltage, in which the switching means includes a charging switch circuit for turning on or off charging of the piezoelectric element, a discharging switch circuit for turning on or off discharging of the piezoelectric element, and a detecting circuit for detecting the charged voltage in the piezoelectric element, and the control means controls to turn on or off the charging switch circuit on the basis of the detected voltage of the detecting circuit, and to take a first image by charging the piezoelectric element in a state of displacing the imaging device, and take a second image by discharging the piezoelectric element in a state before displacement of the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the control means controls to take a first image in a state not displacing the imaging device, and take a second image by charging the piezoelectric element in a state of displacing the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the switching means includes a charge adjusting circuit for stopping the charging operation when the charged voltage in the piezoelectric element becomes a specified value to hold this charged voltage, and restarting charging operation when the charged voltage in the piezoelectric element becomes lower than a specified value, and the control means controls to take a first image in a state not displacing the imaging device, and take a second image by charging the piezoelectric element in a state of displacing the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the switching means includes a charging switch circuit for turning on or off charging of the piezoelectric element, a discharging switch circuit for turning on or off discharging of the piezoelectric element, a detecting circuit for detecting the charged voltage in the piezoelectric element, and comparing means for comparing the charged voltage in the piezoelectric element detected by the detecting means and a reference voltage, the charging switch circuit turns on or off charging of the piezoelectric element on the basis of the result of comparison by the comparing means, and the control means controls to take a first image in a state not displacing the imaging device, and take a second image by charging the piezoelectric element in a state of displacing the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, in which the control means controls so as to stop the charging operation when the piezoelectric element reaches a specified voltage, and to take a first image in a state not displacing the imaging device, and take a second image by charging the piezoelectric element in a state of displacing the imaging device.

According to still another aspect of this invention, a digital camera capable of taking an image by shifting pixels comprises imaging device for taking a subject image, a piezoelectric element for displacing the imaging device, switching means for charging the piezoelectric element by the energy accumulated in a main capacitor for strobe unit emission provided inside or outside, or discharging the piezoelectric element, and control means for controlling the switching means for controlling the charging and discharging sequence of the piezoelectric element, and also controlling to stop the charging operation when the piezoelectric element reaches a specified voltage, in which the switching means includes a charging switch circuit for turning on or off charging of the piezoelectric element, a discharging switch circuit for turning on or off discharging of the piezoelectric element, and a detecting circuit for detecting the charged voltage in the piezoelectric element, and the control means controls to turn on or off the charging switch circuit on the basis of the detected voltage of the detecting circuit, and to take a first image in a state not displacing the imaging device, and take a second image by charging the piezoelectric element in a state of displacing the imaging device.

Other objects and features of this invention will become understood from the following description with reference to the accompanying drawings.

BRIEF DESCRIPTION OF THE DRAWINGS

FIG. 9 is a timing chart explaining the driving and transfer of imaging device, and the charging and discharging timing of piezoelectric element, in the case of taking a first image in discharged state of the piezoelectric element and taking a second image in charged state of the piezoelectric element.

DETAILED DESCRIPTION OF THE PREFERRED EMBODIMENTS

Referring now to the accompanying drawings, preferred embodiments of the digital camera of the invention are described in detail below.

Figure 1:
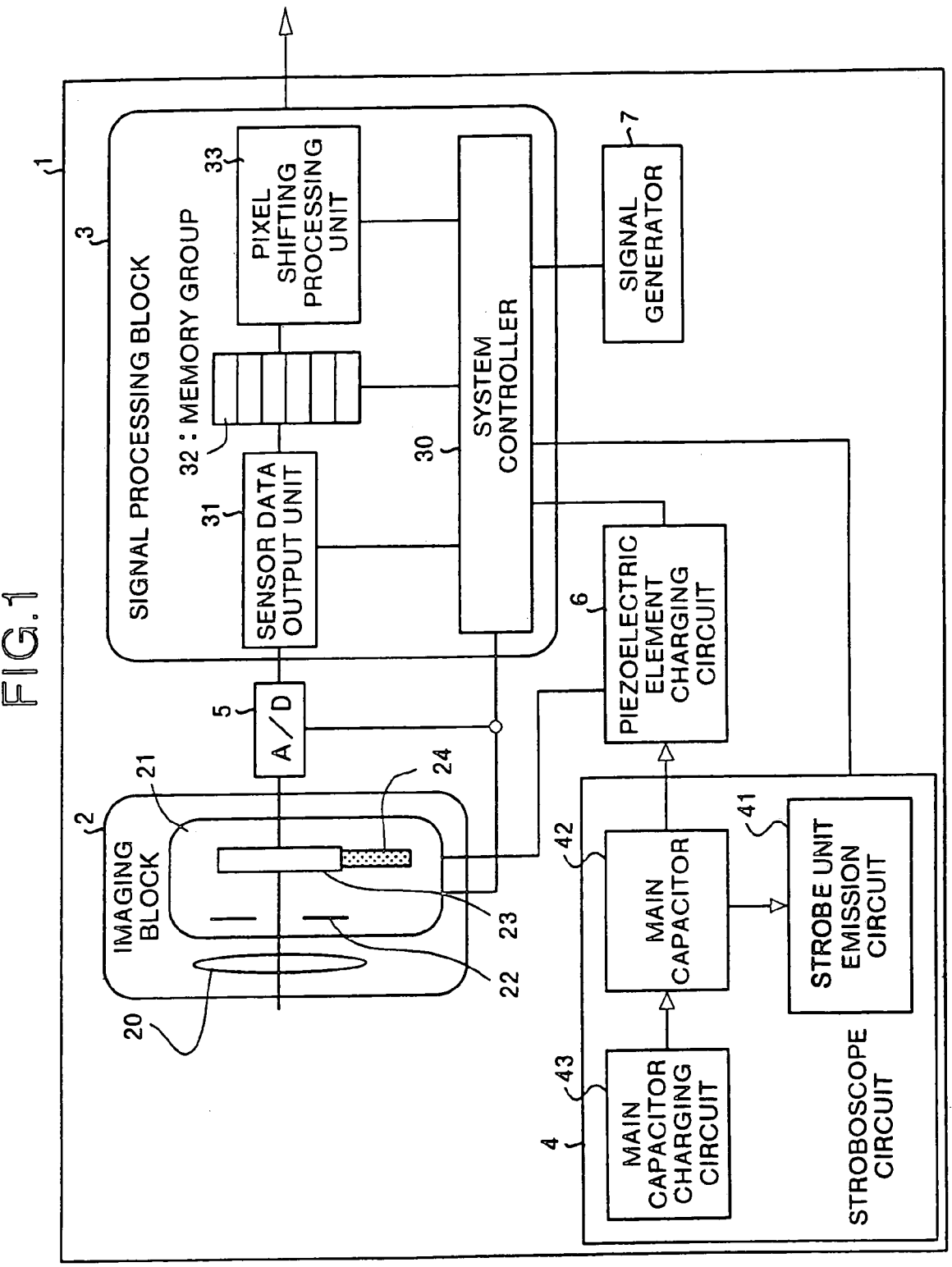
FIG. 1 is a block diagram showing a structure of a digital camera using an imaging device according to the invention.

FIG. 1 is a block diagram of a digital camera of the invention. The digital camera 1 shown in FIG. 1 mainly comprises an imaging block 2 for taking a subject image to obtain analog image data, a signal processing block 3 for processing the digital image data digitized from the analog image data obtained in this imaging block 2, and issuing outside, and a stroboscope circuit 4.

In this digital camera 1, an A/D converter 5 for converting analog image data into digital data is provided between the imaging block 2 and the signal processing block 3, and the signal processing block 3 includes a signal generator 7 for generating a signal depending on the manipulation of mode switch or the like not shown, and issuing the signal to the signal processing block 3.

The imaging block 2 includes an optical lens 20, and an imaging unit 21 provided movably according to the control of the signal processing block 3. The imaging unit 21 includes a shutter mechanism (mechanical shutter or diaphragm) 22 for shielding the light entering the lens 20 by optical mechanism, an imaging device 23 such as CCD for receiving the light entering the lens 20 and converting into an electrical signal (analog image data), and a piezoelectric element 24 for supporting this imaging device 23, moving the photo detecting surface of the imaging device 23 parallel to the imaging surface, and changing the imaging range of the same subject to shift the pixels. The output of the imaging device 23 is supplied into the A/D converter 5.

The signal processing block 3 comprises, for example, a system controller 30, a sensor data output unit 31, a memory group 32 composed of a plurality of memories, a pixel shifting unit 33, and others.

The system controller 30 is coupled to the units of the imaging unit 21 of the imaging block 2, strobe unit circuit 4, A/D converter 5, sensor data output unit 31, memory group 32, pixel shifting processing unit 33, piezoelectric element charging circuit 6, and signal generator 7, and controls the operation depending on the imaging operation, stroboscope emission operation, A/D conversion, read/write of memory, pixel shifting, and key input.

The system controller 30 is composed of microcomputer and others, and executes control and operation of each unit by operating the microcomputer according to the programs stored in the ROM.

The sensor data output unit 31 is coupled to the output of the A/D converter 5, and receives the image data, and issues the input digital image data to any one of the memories of the memory group 32 in a later stage according to the control of the system controller 30.

The memory group 32 has a plurality of memories, and depending on the control of the system controller 30, one memory is used for storing image data for one image taking, or the digital image data is read out from one memory, and is supplied into the pixel shifting processing unit 33 in a later stage.

The pixel shifting processing unit 33 shifts pixels on the basis of the digital image data supplied from the memory group 32, and more specifically, depending on the pixel deviation amount (for example, pixel 1/2 pitch) when the imaging range is changed by the piezoelectric element 24, the same subject is enhanced in picture quality, and finally the image data for one image is obtained.

The output of the pixel shifting processing unit 33 is connected to an external terminal not shown, and is connected to an external device such as personal computer, and is sent out.

The strobe unit circuit 4 is a circuit for emitting a stroboscope by the control of the system controller 30, and comprises a strobe unit emission circuit 41 having reflector and discharge tube for strobe unit emission, a main capacitor 42 for supplying energy to the strobe unit emission circuit 41, a main capacitor charging circuit 43 for charging the main capacitor 42, and others.

The piezoelectric element charging circuit 6 charges the piezoelectric element 24 of the imaging unit 21 by using the main capacitor 42 of the strobe unit circuit 4 as secondary power source, by the control of the system controller 30.

The signal generator 7 includes a release key for imaging by actuating an electronic shutter or shutter mechanism 22, and mode switches for setting various modes.

Figure 2:
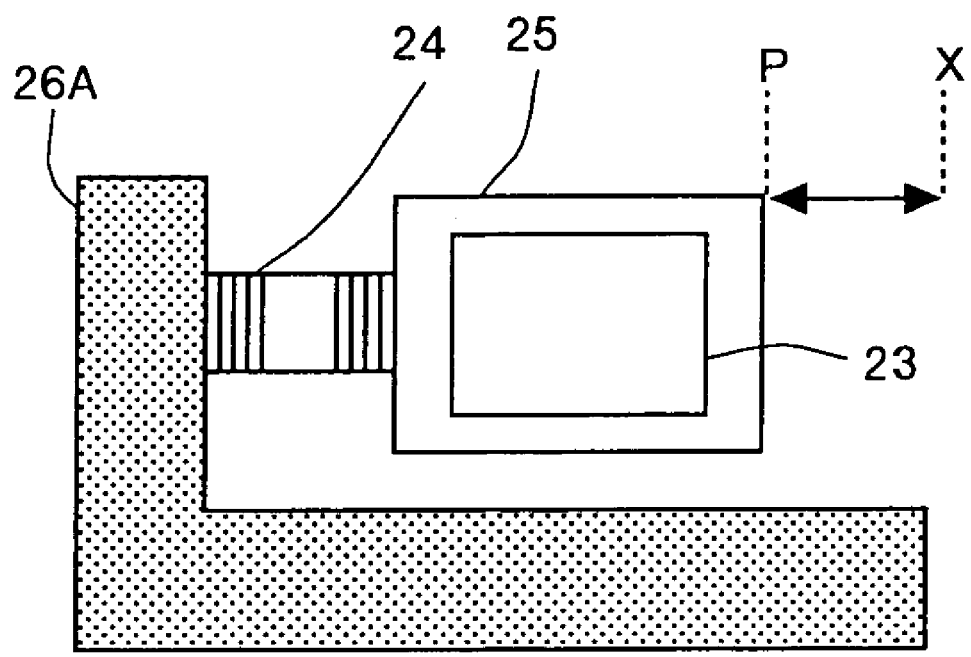
FIG. 2 is a schematic diagram showing a mounting structure of piezoelectric element in imaging block in FIG. 1.

The piezoelectric element 24 is explained. FIG. 2 is a schematic block diagram showing a mounting structure of the piezoelectric element 24 in the imaging block 2. The laminate type piezoelectric element 24 has one end connected to a substrate 26A, and supports a device holder 25 supporting the imaging device 23 at other end. The device holder 25 moves in the arrow direction by the operation of the piezoelectric element 24. While the piezoelectric element 24 is not charged, the imaging device 23 is at the position of P in the diagram, and when the piezoelectric element 24 is charged, the piezoelectric element is extended, and the imaging device 23 is displaced to the position of X. When the piezoelectric element 24 is discharged, it returns to the position of P. The displacement extent (X–P) of the piezoelectric element 24 may be, for example, defined to be 1/2 pixel.

The piezoelectric element 24 changes the imaging range (shifting operation of pixels of the piezoelectric element 24) in horizontal, vertical or diagonal direction, depending on the mounting angle in the imaging block 2.

Figure 3:
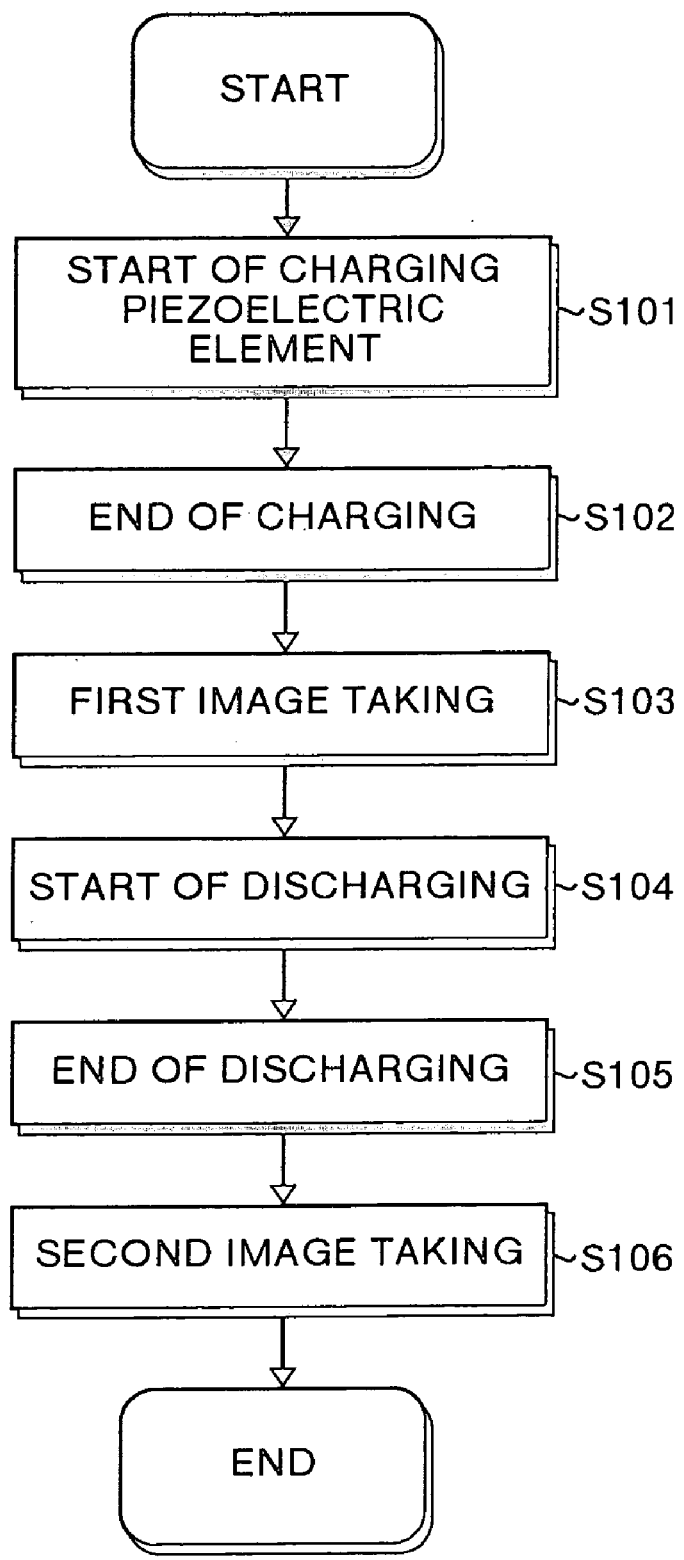
FIG. 3 is a flowchart explaining an image taking operation by shifting pixels.
Figure 4:
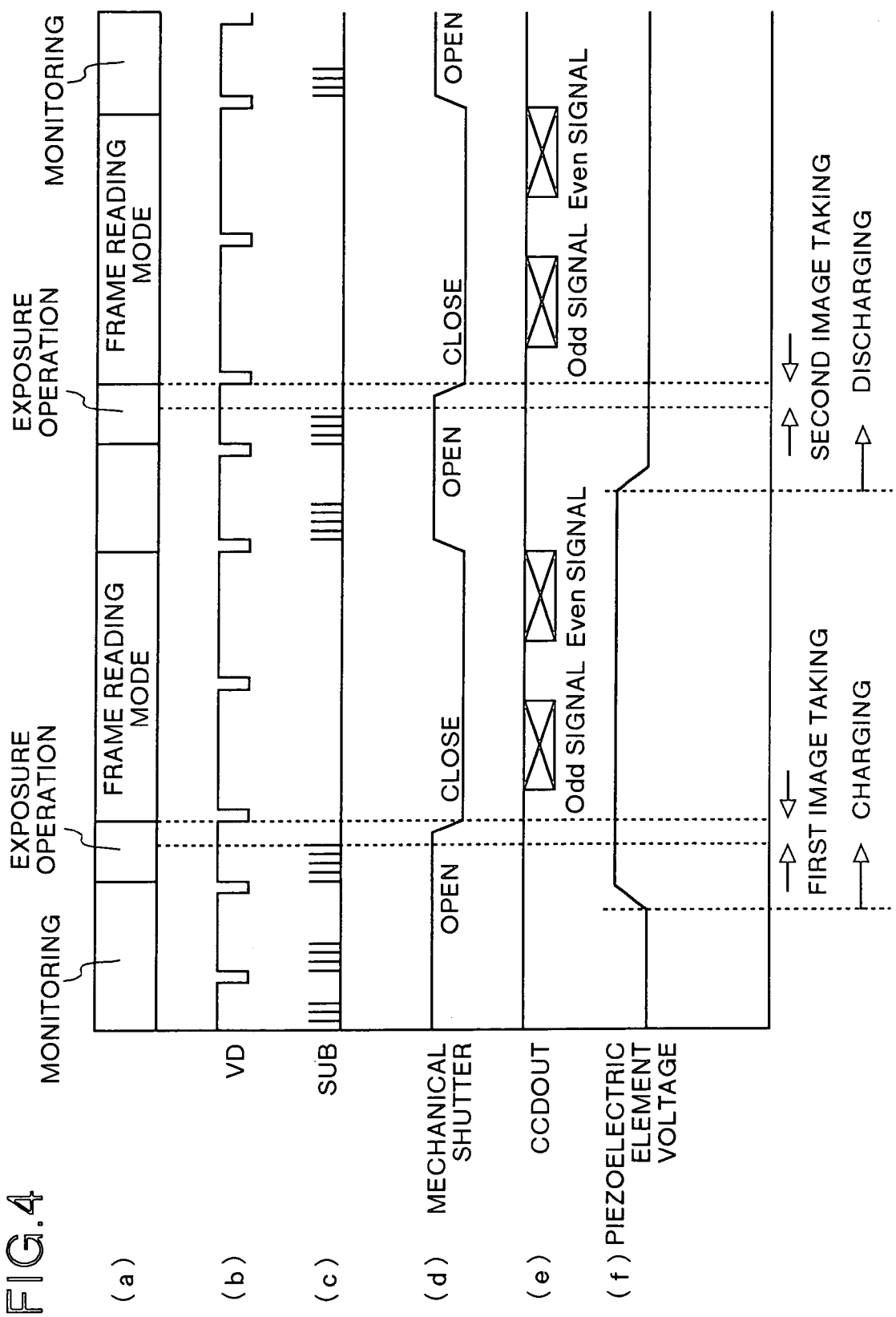
FIG. 4 is a timing chart explaining the driving and transfer of imaging device, and the charging and discharging timing of piezoelectric element.

Referring now to FIG. 3 and FIG. 4, the pixel shifting imaging operation of the digital camera having such structure is explained. FIG. 3 is a flowchart explaining an image taking operation by shifting pixels of the digital camera, and FIG. 4 is a timing chart explaining the driving and transfer of the imaging device 23, and the charging and discharging timing of piezoelectric element 24. In the diagram, (a) shows operating states of the digital camera, (b) shows vertical synchronous signal (VD), (c) shows charge sweep pulse (SUB), (d) shows operation of mechanical shutter, (e) shows charge transfer (CCDOUT) of the imaging device 23, and (f) shows the voltage applied to the piezoelectric element 24.

In FIG. 3, while monitoring as shown in FIG. 4(a), when the release key of the signal generator 7 is pressed, as shown in FIG. 4(f), the piezoelectric element charging circuit 6 starts charging of the piezoelectric element 24 by using the main capacitor 42 as the secondary power source depending on the control signal of the system controller 30 (step S101). The piezoelectric element charging circuit 6, when charging the piezoelectric element 24 up to a prescribed voltage, terminates charging of the piezoelectric element 24 (step 102) automatically (see FIG. 5) or depending on the control signal from the system controller 30 (see FIG. 7). The constitution of the piezoelectric element charging circuit 6 for terminating charging of the piezoelectric element 24 automatically or depending on the control signal from the system controller 30 is explained below. By this charging, the piezoelectric element 24 is extended, and the imaging device 23 is displaced by a specified extent (to the position of X in FIG. 2).

Consequently, as shown in FIG. 4(d), the system controller 30 closes the mechanical shutter, and takes a first image (step S103). After taking the first image, as shown in FIG. 4(e), the electric charge is transferred from the imaging device 23 in the sequence of odd line (Odd signal) and even line (Even signal). After this transfer, the image data is written into the memory for the first image in the memory group 32 according to the control of the system controller 30. After completion of transfer of the electric charge from the imaging device 23, as shown in FIG. 4(d), the system controller 30 opens the mechanical shutter.

Then, as shown in FIG. 4(f), the piezoelectric element charging circuit 6 starts discharging of the piezoelectric element 24 (step S104) depending on the control signal of the system controller 30. By this discharge, the piezoelectric element 24 is expanded, and the imaging device 23 returns to the original position (position P in FIG. 2). When discharging of the piezoelectric element 24 is over (step S105), as shown in FIG. 4(d), the system controller 30 opens the mechanical shutter and takes a second image (step S106). After taking the second image, as shown in FIG. 4 (e), the electric charge is transferred from the imaging device 23 in the sequence of odd line (Odd signal) and even line (Even signal). The image data obtained from the second image taking is transferred same as in the case of the first image taking, and is written into a different memory from the memory of the first image in the memory group 32 according to the control of the system controller 30.

The pixel shifting processing unit 33 enhances the picture quality in the same subject depending on the pixel shift amount (for example, pixel 1/2 pitch) when the imaging range is changed by the piezoelectric element 24, on the basis of the digital image data taken by the first image and the digital image data taken by the second image supplied from the memory group 32, and finally the image data for one picture is obtained.

Figure 5:
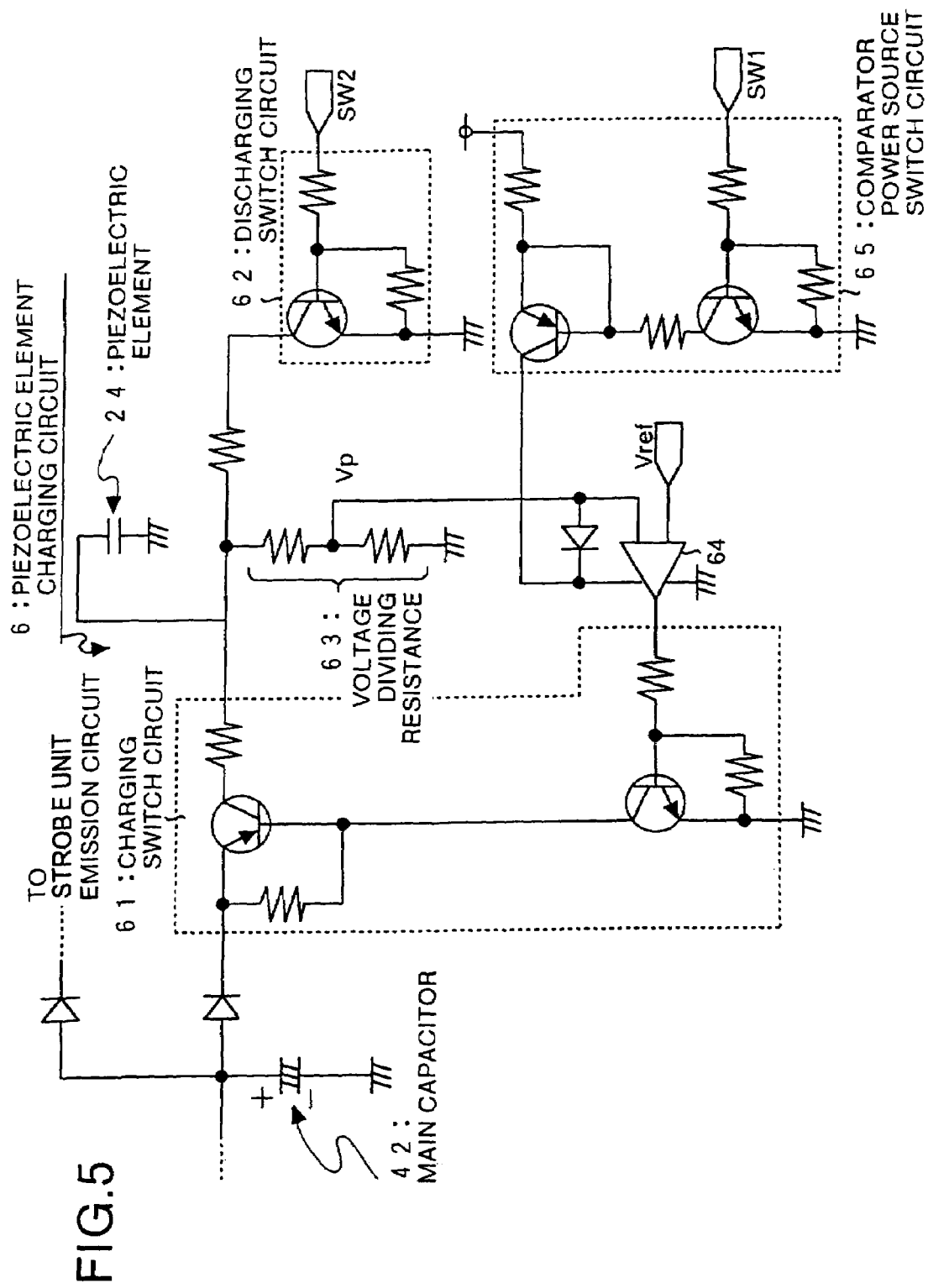
FIG. 5 is a circuit diagram showing a structure of a piezoelectric element charging circuit for automatically terminating the charging operation into the piezoelectric element.

FIG. 5 is a circuit diagram showing a structure of the piezoelectric element charging circuit 6 for automatically terminating the charging operation into the piezoelectric element 24. The piezoelectric element charging circuit 6 comprises, as shown in the diagram, a charging switch circuit 61 for turning on or off charging of the piezoelectric element 24 on the basis of the output of a comparator 64, a discharging switch circuit 62 for turning on or off discharging of the piezoelectric element 24, a voltage dividing resistance 63 for detecting the voltage of the piezoelectric element 24, the comparator 64 for comparing the voltage of the piezoelectric element 24 and the reference voltage, and a comparator power source switch circuit 65 for turning on or off supply of power source to the comparator 64.

As mentioned above, the energy charged in the main capacitor 42 is used as the secondary power source of the piezoelectric element 24. First, the operation of charging the piezoelectric element 24 is explained. To charge the piezoelectric element 24, when a control signal of H level is supplied from the system controller 30 to SW1 of the comparator power source switch circuit 65, the comparator power source switch circuit 65 supplies power source to the comparator 64.

The comparator 64 compares the detected voltage VP obtained by dividing the voltage of the piezoelectric element 24 by the voltage dividing resistance 63, and the reference voltage (Vref), and when the voltage VP of the piezoelectric element 24 is less than the reference voltage (Vref), a signal of H level is issued to the charging switch circuit 61. The charging switch circuit 61 is turned on when a signal of H level is entered from the comparator 64, and charging from the main capacitor 42 to the piezoelectric element 24 is started. The reference voltage (Vref) may be either fixed voltage, or variable voltage controlled by the system controller 30.

When charging into the piezoelectric element 24 is advanced until the detected voltage VP of the voltage dividing resistance 63 becomes equal to the reference voltage (Vref), the output level of the comparator 64 to the charging switch circuit 61 becomes L level, and the charging switch circuit 61 is turned off, and charging into the piezoelectric element 24 is terminated automatically.

The operation of discharging the piezoelectric element 24 is explained below. When discharging the piezoelectric element 24, the system controller 30 issues a control signal of L level to Sw1 of the comparator power source switch circuit 65 to turn off the comparator power source switch circuit 65, and supply of power source to the comparator 64 is cut off, and a control signal of H level is issued to SW2 of the discharging switch circuit 62 to turn on the discharging switch circuit 62, thereby discharging the electric charge accumulated in the piezoelectric element 24 to the ground.

In this case, supply of power source to the comparator 64 is controlled by the control of SW1, but it is also possible to turn on the reference voltage (Vref) by the control of SW1. The illustration of circuit configuration in such case is omitted.

Figure 6:
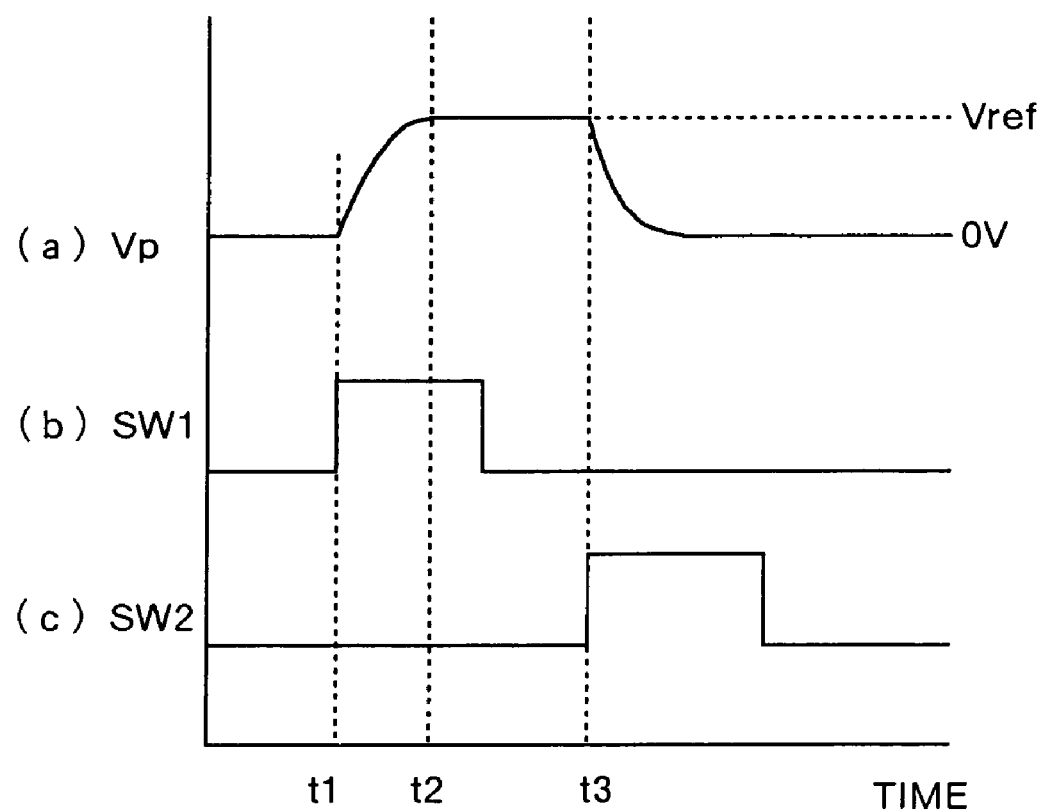
FIG. 6 is a diagram showing the charging and discharging sequence of the piezoelectric element charging circuit in FIG. 5.

Referring next to FIG. 6, the charging and discharging sequence of the piezoelectric element charging circuit 6 in FIG. 5 is explained. FIG. 6 is a diagram showing the charging and discharging sequence of the piezoelectric element charging circuit 6 in FIG. 5. In the diagram, (a) shows the detected voltage VP obtained by dividing the voltage of the piezoelectric element 24 by the voltage dividing resistance 63, (b) shows a control signal entered from the system controller 30 into SW1 of the comparator power source switch circuit 65, and (c) shows a control signal entered from the system controller 30 into SW2 of the charging switch circuit 61.

In FIG. 6, the initial state of the voltage value of the piezoelectric element 24 is 0 V. The system controller 30 issues a control signal of H level to SW1 at time t1, and starts charging of the piezoelectric element 24. After start of charging, at time t2, converging at VP=Vref, charging of the piezoelectric element 24 is stopped automatically. In this state, a first image is taken. Later, the system controller 30 sets the control signal to SW1 to L level, and at time t3, a control signal of H level is issued to SW2, and the piezoelectric element 24 is discharged. After completion of discharging, when becoming VP=0 V, a second image is taken.

Figure 7:
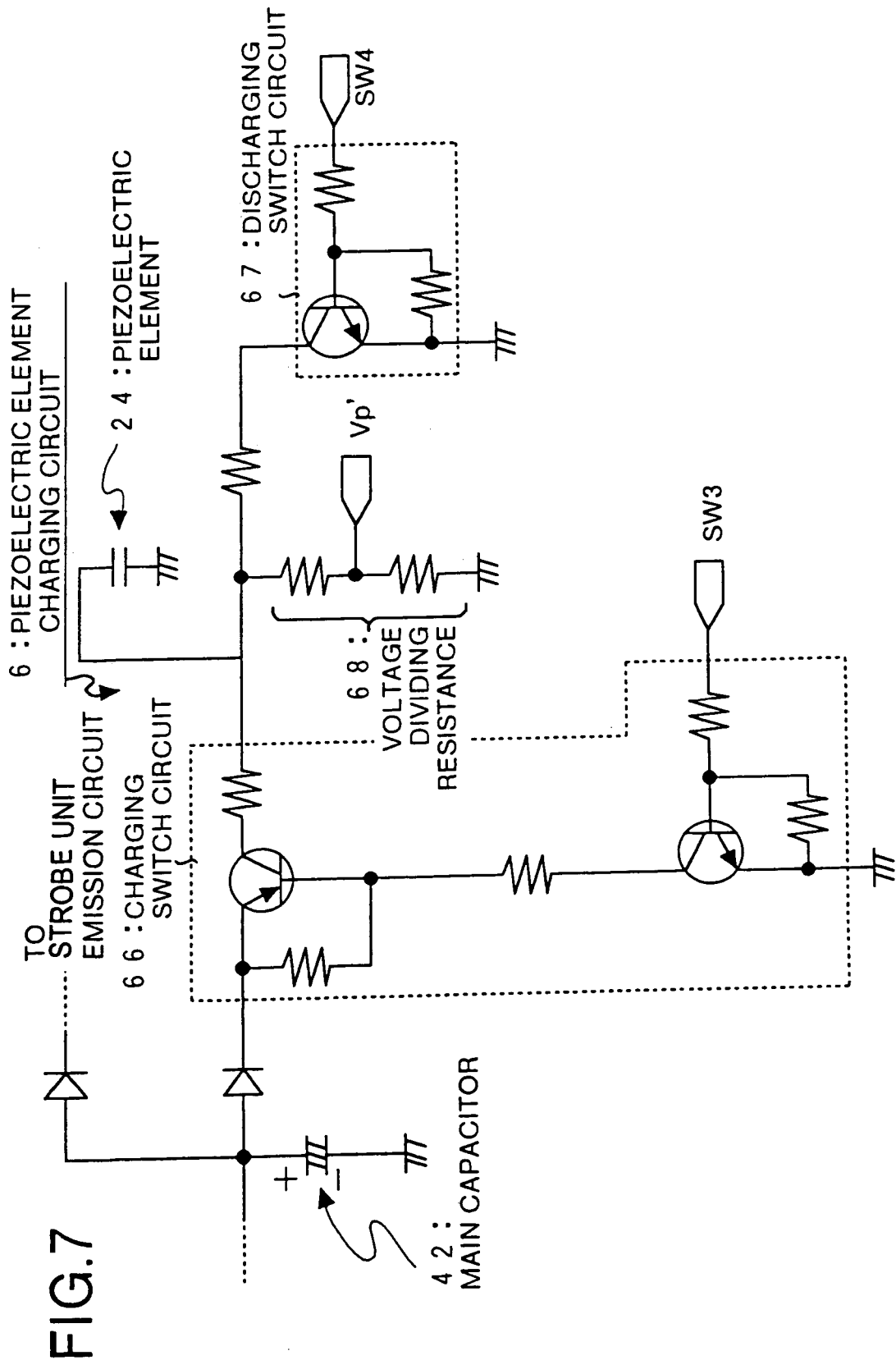
FIG. 7 is a circuit diagram showing the structure of piezoelectric element charging circuit in the case of control of charging stop to the piezoelectric element by a system controller.

FIG. 7 is a circuit diagram showing the structure of the piezoelectric element charging circuit 6 in the case of control of charging stop to the piezoelectric element 24 by the system controller 30. The piezoelectric element charging circuit 6 comprises, as shown in the diagram, a charging switch circuit 66 for turning on or off charging into the piezoelectric element 24 from the main capacitor 42 by the control of the system controller 30, a discharging switch circuit 67 for turning on or off discharging of the piezoelectric element 24 by the control of the system controller 30, and a voltage dividing resistance 68 for detecting the voltage of the piezoelectric element 24.

As mentioned above, the energy charged in the main capacitor 42 is used as the secondary power source of the piezoelectric element 24. To charge the piezoelectric element 24, the system controller 30 issues a control signal of H level to SW3 of the charging switch circuit 66, and the charging switch circuit 66 is turned on, and charging from the main capacitor 42 into the piezoelectric element 24 is started.

On the other hand, a detected voltage VP' obtained by dividing the voltage of the piezoelectric element 24 by the voltage dividing resistance 68 is issued to the system controller 30. The system controller 30 converts the entered detected voltage VP' into digital data by a built-in A/D converter, and acquires as detected voltage data, and judges if it is a specified voltage value or not. The system controller 30, when the piezoelectric element 24 is charged up to the specified voltage value, issues a control signal of L level to SW3 of the charging switch circuit 66, and turns off the charging switch circuit 66 to terminate the charging of the piezoelectric element 24, thereby maintaining the high potential of the piezoelectric element 24.

The operation of discharging the piezoelectric element 24 is explained. When discharging the piezoelectric element 24, the system controller 30 issues a control signal of H level to SW4 of the discharging switch circuit 67 to turn on the discharging switch circuit 67, and the electric charge accumulated in the piezoelectric element 24 is discharged to the ground.

Figure 8:
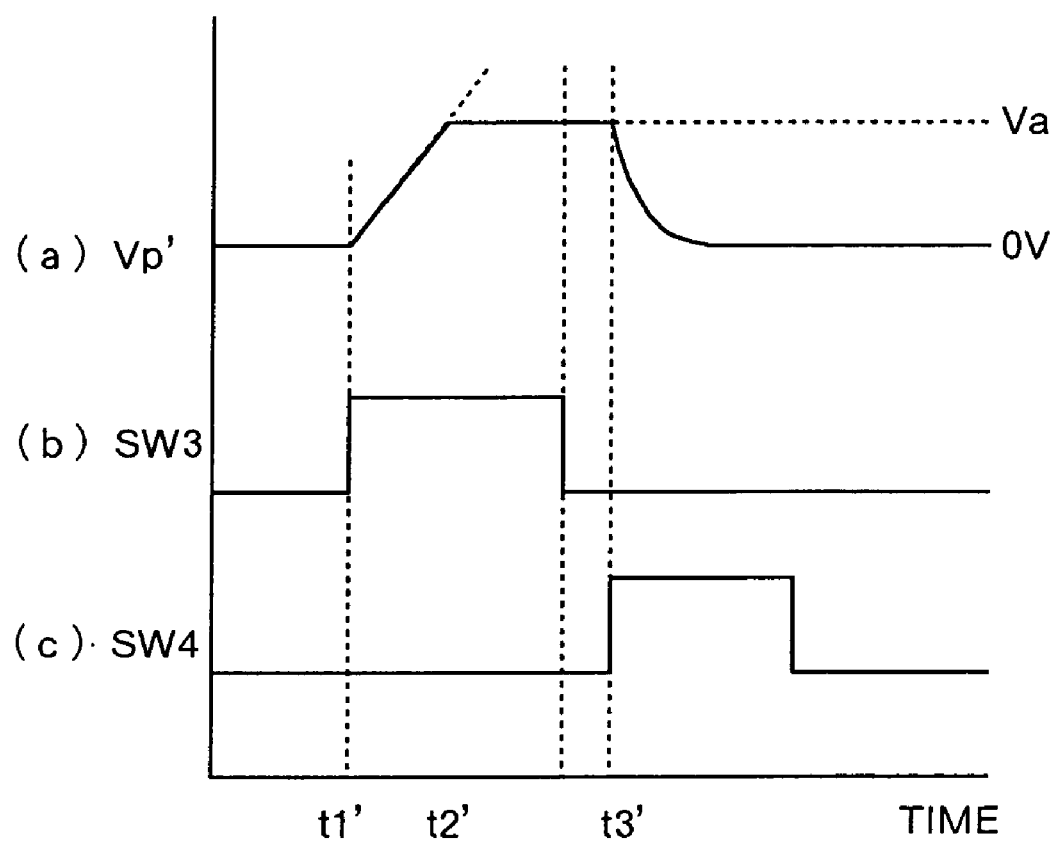
FIG. 8 is a diagram showing the charging and discharging sequence of the piezoelectric element charging circuit in FIG. 7.

Referring to FIG. 8, the charging and discharging sequence of the piezoelectric element charging circuit 6 in FIG. 7 is explained. FIG. 8 is a diagram showing the charging and discharging sequence of the piezoelectric element charging circuit 6 in FIG. 7. In the diagram, (a) shows the detected voltage VP' obtained by dividing the voltage of the piezoelectric element 24 by the voltage dividing resistance 68, (b) shows a control signal entered from the system controller 30 into SW3 of the charging switch circuit 66, and (c) shows a control signal entered from the system controller 30 into SW4 of the discharging switch circuit 67.

In FIG. 8, the initial state of the voltage value of the piezoelectric element 24 is 0 V. In the case of VP'= Va, it is supposed that the piezoelectric element 24 is charged to a specified voltage. The system controller 30 issues a control signal of H level to SW3 at time t1', and starts charging of the piezoelectric element 24. After start of charging, at time t2', achieving VP'=Va, when the piezoelectric element 24 is charged up to the specified voltage value, the system controller 30 stops charging of the piezoelectric element 24 by issuing a control signal of L level to SW3. In this state, a first image is taken. Later, the system controller 30 issues a control signal of H level to SW4 at time t3', and discharges the piezoelectric element 24. After completion of discharging of the piezoelectric element 24, when becoming VP 0 V, a second image is taken.

As explained herein, since the main capacitor 42 for strobe unit emission is used as the electric power supply source for the piezoelectric element 24, without particularly preparing the boosting circuit in the digital camera, the piezoelectric element can be operated.

In the piezoelectric element charging circuit 6 shown in FIG. 5 and FIG. 7, at the time of taking images by shifting pixels, the piezoelectric element 24 is charged by the energy accumulated in the main capacitor 42 for strobe unit emission, or the piezoelectric element 24 is discharged, and the system controller 30 controls the piezoelectric element charging circuit 6, and controls the charging and discharging sequence of the piezoelectric element 24, and therefore the piezoelectric element can be operated without particularly preparing the boosting circuit in the digital camera, and an image of high definition is obtained.

In the piezoelectric element charging circuit 6 shown in FIG. 5, moreover, at the time of taking images by shifting pixels, the charging operation is stopped when the charged voltage of the piezoelectric element becomes as specified, and this charged voltage is held, and when the charged voltage of the piezoelectric element drops below the specified value, the charging operation is restarted, so that the load of the system controller 30 can be lessened.

The piezoelectric element charging circuit 6 shown in FIG. 5 comprises the charging switch circuit 61 for turning on or off charging of the piezoelectric element 24, the discharging switch circuit 62 for turning on or off discharging of the piezoelectric element 24, the voltage dividing resistance 63 for detecting the charged voltage of the piezoelectric element 24, and the comparator 64 for comparing the charged voltage of the piezoelectric element 24 detected by the voltage dividing resistance 63 and the reference voltage, and the charging switch circuit 61 turns on or off charging of the piezoelectric element 24 on the basis of the result of comparison of the comparator 64, so that the piezoelectric element charging circuit can be realized in a simple structure.

In the piezoelectric element charging circuit 6 shown in FIG. 7, at the time of taking images by shifting pixels, the system controller 30 stops the charging operation when the piezoelectric element 24 reaches the specified voltage, and therefore the charging end can be controlled by the system controller 30, so that the piezoelectric element charging circuit can be realized in a small circuit structure.

The piezoelectric element charging circuit 6 shown in FIG. 7 comprises the charging switch circuit 66 for turning on or off charging of the piezoelectric element 24, the discharging switch circuit 67 for turning on or off discharging of the piezoelectric element 24, and the voltage dividing resistance 68 for detecting the charged voltage of the piezoelectric element 24, and the system controller 64 turns on or off the charging switch circuit 66 on the basis of the detected voltage of the voltage dividing resistance 68, and therefore the piezoelectric element charging circuit can be realized in a simple structure, and the piezoelectric element charging circuit can be realized in a smaller circuit structure.

In the foregoing explanation, at the time of taking images by shifting pixels, the first image is taken by charging the piezoelectric element 24 and displacing the imaging device 23, and the second image is taken by discharging the piezoelectric element 24 and returning the imaging device 23 to the original position, but the same effects are obtained in the reverse procedure, that is, by taking the first image by discharging the piezoelectric element 24 and taking the second image by charging the piezoelectric element 24.

FIG. 9 is a timing chart explaining the driving and transfer of the imaging device 24, and the charging and discharging timing of piezoelectric element, in the case of taking a first image in discharged state of the piezoelectric element 24 and taking a second image in charged state of the piezoelectric element 24. In the diagram, (a) shows operating states of the digital camera, (b) shows vertical synchronous signal (VD), (c) shows charge sweep pulse (SUB), (d) shows operation of mechanical shutter, (e) shows charge transfer (CCDOUT) of the imaging device 23, and (f) shows the voltage applied to the piezoelectric element 24.

While monitoring as shown in FIG. 9(a), when the release key of the signal generator 7 is pressed, as shown in FIG. 9(d), the system controller 30 closes the mechanical shutter, and takes a first image. In this case, the imaging device 23 is at the initial position (position P in FIG. 2). After taking the first image, as shown in FIG. 9(e), the electric charge is transferred from the imaging device 23 in the sequence of odd line (Odd signal) and even line (Even signal).

After completion of transfer of the electric charge from the imaging device 23, as shown in FIG. 9(d), the system controller 30 opens the mechanical shutter, and successively, as shown in FIG. 9(f), the piezoelectric element 24 is charged. When charging of the piezoelectric element 24 is over, as shown in FIG. 9(d), the mechanical shutter is opened to take a second image. In this case, by the charging, the piezoelectric element 24 is expanded, and the imaging device 23 is displaced by a specified extent (to be at position X in FIG. 2). After taking the second image, as shown in FIG. 9(e), the electric charge is transferred from the imaging device 23 in the sequence of odd line (Odd signal) and even line (Even signal), and the piezoelectric element 24 is discharged spontaneously.

The desired high definition image is obtained by synthesizing the first and second image data in the pixel shifting processing unit 32, but if operated at high speed by the hardware, the operation in the unit of 10 seconds is needed for setting of the subject in order to obtain the next high definition image. When this synthesis process is done by the software operation of the CPU, it takes the time in the unit of 10 seconds.

On the other hand, the characteristics of the piezoelectric element 24 is represented by the capacitor of about 0.2 $\mu$F, and supposing the voltage dividing resistance 63 or 68 in FIG. 5 or FIG. 7 used for obtaining the detected voltage VP to be 1 M_, if charging is stopped, the piezoelectric element 24 is spontaneously discharged in about 0.2 second. Therefore, when the second image is taken in the charged state of the piezoelectric element 24, by making use of this spontaneous discharge, the discharging switch circuits 62, 67 in FIG. 5 and FIG. 7 can be omitted.

According to the experiment by the present inventors, when the piezoelectric element and imaging device are not directly coupled, that is, without using the mechanism for expanding the displacement extent of the piezoelectric element, it is confirmed that the piezoelectric element returns to the initial position, even by a slow discharge of about 0.2 second, without having effects of friction or the like.

The invention is not limited to the illustrated embodiment alone, but may be changed or modified within a range not departing from the true spirit of the invention. For example, in the embodiment, the internal strobe unit type (the strobe unit circuit 4 in FIG. 1) is explained, but the invention can be similarly applied in the case of using an external type strobe unit device.

As explained herein, according to the invention as set forth in one aspect, the imaging device takes a subject image, the piezoelectric element displaces the imaging device, and energy accumulating means for supplying an electric power to other unit is used as an electric power supply source for the piezoelectric element, and therefore the piezoelectric element can be operated without particularly preparing boosting circuit in the digital camera.

According to the invention as set forth in another aspect, relating to one aspect, the energy accumulating means is composed of a main capacitor for strobe unit emission provided inside or outside, and the piezoelectric element is charged by the energy accumulated in this main capacitor, and therefore in addition to the effects of one aspect, the piezoelectric element can be operated by the main capacitor for strobe unit emission.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the control means controls to take a first image by charging the piezoelectric element in a state of displacing the imaging device, and take a second image by discharging the piezoelectric element in a state before displacement of the imaging device, and therefore the piezoelectric element can be operated without particularly preparing boosting circuit in the digital camera, and also an image of high definition can be obtained.

According to the invention as set forth in still another aspect, the imaging device takes a subject image, a piezoelectric element displaces the imaging device, switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the switching means includes a charge adjusting circuit for stopping the charging operation when the charged voltage in the piezoelectric element becomes a specified value to hold this charged voltage, and restarting charging operation when the charged voltage in the piezoelectric element becomes lower than a specified value, and the control means controls to take a first image by charging the piezoelectric element in a state of displacing the imaging device, and take a second image by discharging the piezoelectric element in a state before displacement of the imaging device, and therefore the piezoelectric element can be operated without particularly preparing boosting circuit in the digital camera, and also an image of high definition can be obtained. Moreover, since the charging end is controlled by the switching means, the load of the control means is lessened.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the switching means includes a charging switch circuit for turning on or off charging of the piezoelectric element, a discharging switch circuit for turning on or off discharging of the piezoelectric element, a detecting circuit for detecting the charged voltage in the piezoelectric element, and comparing means for comparing the charged voltage in the piezoelectric element detected by the detecting means and a reference voltage, the charging switch circuit turns on or off charging of the piezoelectric element on the basis of the result of comparison by the comparing means, and the control means controls to take a first image by charging the piezoelectric element in a state of displacing the imaging device, and take a second image by discharging the piezoelectric element in a state before displacement of the imaging device, and therefore the piezoelectric element can be operated without particularly preparing boosting circuit in the digital camera, and also an image of high definition can be obtained. Moreover, since the charging end is controlled by the comparing means of the switching means, the load of the control means is lessened.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the control means controls so as to stop the charging operation when the piezoelectric element reaches a specified voltage, and to take a first image by charging the piezoelectric element in a state of displacing the imaging device, and take a second image by discharging the piezoelectric element in a state before displacement of the imaging device, and therefore the piezoelectric element can be operated without particularly preparing boosting circuit in the digital camera, and also an image of high definition can be obtained. Moreover, since the charging end is controlled by the control means, the switching means is realized in a smaller circuit structure.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, and also controls to stop the charging operation when the piezoelectric element reaches a specified voltage, whereas the switching means includes a charging switch circuit for turning on or off charging of the piezoelectric element, a discharging switch circuit for turning on or off discharging of the piezoelectric element, and a detecting circuit for detecting the charged voltage in the piezoelectric element, and the control means controls to turn on or off the charging switch circuit on the basis of the detected voltage of the detecting circuit, and to take a first image by charging the piezoelectric element in a state of displacing the imaging device, and take a second image by discharging the piezoelectric element in a state before displacement of the imaging device, and therefore the piezoelectric element can be operated without particularly preparing boosting circuit in the digital camera, and also an image of high definition can be obtained. Moreover, since the charging end is controlled by the control means, the switching means is realized in a smaller circuit structure.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the control means controls to take a first image in a state not displacing the imaging device, and take a second image by charging the piezoelectric element in a state of displacing the imaging device, and therefore the piezoelectric element can be operated without particularly preparing boosting circuit in the digital camera, and also an image of high definition can be obtained.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the switching means includes a charge adjusting circuit for stopping the charging operation when the charged voltage in the piezoelectric element becomes a specified value to hold this charged voltage, and restarting charging operation when the charged voltage in the piezoelectric element becomes lower than a specified value, and the control means controls to take a first image in a state not displacing the imaging device, and take a second image by charging the piezoelectric element in a state of displacing the imaging device, and therefore the piezoelectric element can be operated without particularly preparing boosting circuit in the digital camera, and also an image of high definition can be obtained. Moreover, since the charging end is controlled by the switching means, the load of the control means is lessened.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the switching means includes a charging switch circuit for turning on or off charging of the piezoelectric element, a discharging switch circuit for turning on or off discharging of the piezoelectric element, a detecting circuit for detecting the charged voltage in the piezoelectric element, and comparing means for comparing the charged voltage in the piezoelectric element detected by the detecting means and a reference voltage, the charging switch circuit turns on or off charging of the piezoelectric element on the basis of the result of comparison by the comparing means, and the control means controls to take a first image in a state not displacing the imaging device, and take a second image by charging the piezoelectric element in a state of displacing the imaging device, and therefore the piezoelectric element can be operated without particularly preparing boosting circuit in the digital camera, and also an image of high definition can be obtained. Moreover, since the charging end is controlled by the comparing means of the switching means, the load of the control means is lessened.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, whereas the control means controls so as to stop the charging operation when the piezoelectric element reaches a specified voltage, and to take a first image in a state not displacing the imaging device, and take a second image by charging the piezoelectric element in a state of displacing the imaging device, and therefore the piezoelectric element can be operated without particularly preparing boosting circuit in the digital camera, and also an image of high definition can be obtained. Moreover, since the charging end is controlled by the control means, the switching means is realized in a smaller circuit structure.

According to the invention as set forth in still another aspect, the imaging device takes a subject image, the piezoelectric element displaces the imaging device, the switching means charges the piezoelectric element by the energy accumulated in a main capacitor for strobe unit emission provided inside or outside, or discharges the piezoelectric element, and the control means controls the switching means for controlling the charging and discharging sequence of the piezoelectric element, and also controls to stop the charging operation when the piezoelectric element reaches a specified voltage, whereas the switching means includes a charging switch circuit for turning on or off charging of the piezoelectric element, a discharging switch circuit for turning on or off discharging of the piezoelectric element, and a detecting circuit for detecting the charged voltage in the piezoelectric element, and the control means controls to turn on or off the charging switch circuit on the basis of the detected voltage of the detecting circuit, and to take a first image in a state not displacing the imaging device, and take a second image by charging the piezoelectric element in a state of displacing the imaging device, and therefore the piezoelectric element can be operated without particularly preparing boosting circuit in the digital camera, and also an image of high definition can be obtained. Moreover, since the charging end is controlled by the control means, the switching means is realized in a smaller circuit structure.

The present document incorporates by reference the entire contents of Japanese priority documents, 11-307635 filed in Japan on Oct. 28, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera for acquiring image data by acquiring a subject image, comprising:
   an imaging device configured to acquire said subject image;
   a piezoelectric element configured to displace said imaging device;
   a detecting circuit configured to detect a representative voltage indicative of a level of voltage presently being applied to the piezoelectric element;
   a comparing unit configured to compare a reference voltage corresponding to a predetermined amount of displacement of the imaging device with the representative voltage detected by the detecting circuit and to provide an output indicating that the representative voltage detected by the detecting circuit is less than the reference voltage;
   a charging unit including at least one energy accumulating unit configured to power a strobe unit; and
   a control element configured to supply electricity from the energy accumulating unit of the charging unit to the piezoelectric element to raise said level of voltage presently being applied to the piezoelectric element responsive to the comparing unit providing the output indicating that the representative voltage being detected by the detecting circuit is less than the reference voltage.

2. The digital camera according to claim 1, wherein said energy accumulating unit includes a main capacitor.

3. A digital camera capable of acquiring an image by shifting pixels, comprising:
   an imaging device configured to capture a subject image;
   a piezoelectric element configured to displace said imaging device;
   a detecting circuit configured to detect a representative voltage indicative of a level of voltage presently being applied to the piezoelectric element;
   a switching unit configured to enable a charging unit configured to charge said piezoelectric element by the energy accumulated in at least one main capacitor configured to supply energy to a strobe unit to provide strobe unit emission or to enable discharge of said piezoelectric element;
   a comparing unit in the charging unit configured to compare a reference voltage corresponding to a predetermined amount of displacement of the imaging device with the representative voltage detected by the detecting circuit and to provide a charge indicating output indicating that the representative voltage being detected by the detecting circuit is less than the reference voltage; and
   a control unit configured to control said switching unit to enable the charging unit including the comparing unit to enable the charging of said piezoelectric element by the energy accumulated in the at least one main capacitor in response to the charging indicating output of said comparing unit in a first image mode including a state of displacing said imaging device by the piezoelectric element or to control said switching unit to enable the discharge of said piezoelectric element in a second image mode including no displacement of said imaging device by the piezoelectric element.

4. A digital camera capable of acquiring an image by shifting pixels, comprising:

an imaging device configured to acquire a subject image;

a piezoelectric element configured to displace said imaging device;

a detecting circuit configured to detect a representative voltage indicative of a level of voltage presently being applied to the piezoelectric element;

a switching unit configured to enable a charging unit including a charge adjusting circuit to perform a charging operation to charge said piezoelectric element to a specified value of charge voltage by the energy accumulated in at least one main capacitor configured to supply energy to a strobe unit to provide strobe unit emission or to enable a discharging operation with discharge of any charge voltage on said piezoelectric element; and a control unit configured to control said switching unit to switch the charging unit including the charge adjusting circuit into a first state to provide the charging operation of said piezoelectric element with image device displacement in a first imaging mode or to switch the charging unit including the charge adjusting circuit into a second state to provide the discharging operation to insure no displacement of said piezoelectric element in a second imaging mode, wherein said charge adjusting circuit includes a comparator portion configured to compare a reference voltage corresponding to a predetermined amount of displacement of the imaging device with the representative voltage detected by the detecting circuit and to provide a first output indicating that the representative voltage being detected by the detecting circuit is less than the reference voltage or a second output indicating that the representative voltage being detected by the detecting circuit is equal to or greater than the reference voltage and the charging unit including the charge adjusting circuit provides the charging operation in response to the first output, stops the-charging operation in response to the second output, and restarts the charging operation when the first output is again provided, and said control unit is configured to control acquiring a first image during said first imaging mode, and capturing a second image during said second imaging mode of said imaging device.

5. A digital camera capable of acquiring an image by shifting pixels, comprising:

an imaging device configured to capture a subject image;

a piezoelectric element configured to displace said imaging device;

a switching unit configured to charge said piezoelectric element by the energy accumulated in at least one main capacitor configured to supply energy to a strobe unit to provide strobe unit emission or to discharge said piezoelectric element; and a control unit configured to control said switching unit to provide a charging operation of said piezoelectric element with image device displacement in a first imaging mode or to provide a discharging operation to insure no displacement of said piezoelectric element in a second imaging mode, wherein said switching unit includes a charging switch circuit configured to turn on or off charging of said piezoelectric element by the energy accumulated in at least one main capacitor during said charging operation, a discharging switch circuit configured to turn on or off discharging of said piezoelectric element, a detecting circuit configured to detect a representative voltage indicating a level of voltage presently being applied to said piezoelectric element, and a comparing circuit configured to make a comparison of the representative voltage detected by said detecting circuit and a reference voltage, said charging switch circuit configured to turn on the charging operation of said piezoelectric element when the comparison indicates that the representative voltage detected by the detecting circuit is less than the reference voltage, and said control unit is configured to control acquiring a first image during said first imaging mode, and capturing a second image during said second imaging mode of said imaging device.

6. A digital camera capable of taking an image by shifting pixels, comprising:

an imaging device configured to capture a subject image;

a piezoelectric element configured to displace said imaging device;

a switching unit configured to charge said piezoelectric element by energy accumulated in at least one main capacitor configured to supply energy to a strobe unit to provide strobe unit emission or to discharge said piezoelectric element;

a detecting circuit configured to detect a representative voltage indicating a level of voltage presently being applied to the piezoelectric element; and a control unit configured to control said switching unit to provide a charging operation of said piezoelectric element with image device displacement in a first imaging mode or to provide a discharging operation to insure no displacement of said piezoelectric element in a second imaging mode, wherein said switching unit includes a comparator portion configured to compare a reference voltage corresponding to a predetermined amount of displacement of the imaging device with the representative voltage detected by the detecting circuit and to provide a charging output indicating that the representative voltage detected by the detecting circuit is less than the reference voltage and the switching unit responding to the charging output to charge said piezoelectric element by the energy accumulated in the at least one main capacitor during the charging operation.

7. A digital camera capable of acquiring an image by shifting pixels, comprising:

an imaging device configured to capture a subject image;

a piezoelectric element configured to displace said imaging device;

a switching unit configured to charge said piezoelectric element by the energy accumulated in at least one main capacitor configured to supply energy to a strobe unit to provide strobe unit emission or to discharge said piezoelectric element;

a control unit configured to control said switching unit to provide a charging operation of said piezoelectric element with image device displacement in a first imaging mode or to provide a discharging operation to insure no displacement of said piezoelectric element in a second imaging mode a charging switch circuit configured to turn on or off charging of said piezoelectric element by the energy accumulated in the at least one main capacitor during said charging operation;

a discharging switch circuit configured to turn on or off discharging of said piezoelectric element during said discharging operation;

a detecting circuit configured to detect a representative voltage indicative of a voltage level presently being applied to said piezoelectric element;

a comparing unit configured to make a comparison of the representative voltage detected by said detecting circuit and a reference voltage indicating a displacement of the imaging device, wherein said charging switch circuit is configured to turn on charging of said piezoelectric element when the comparison indicates that the representative voltage detected by said detecting circuit is less than the reference voltage during the charging operation.

8. A digital camera capable of acquiring an image by shifting pixels, comprising:

an imaging device configured to capture a subject image;

a means for displacing said imaging device responsive to a charging voltage;

a means for applying the charging voltage to said means for displacing from energy accumulated in at least one means for storing energy, said means for storing energy also supplying stored energy to a strobe unit for providing strobe unit emission;

a means for discharging the charging voltage from said means for displacing;

a detecting means for detecting a representative voltage indicating a level of voltage presently being applied to the means for displacing;

a means for controlling said means for applying the charging voltage to said means for displacing to provide the charging voltage to said means for displacing for providing image device displacement in a first imaging mode or for controlling said means for discharging to discharge the charging voltage from said means for displacing to insure no displacement of said means for displacing in a second imaging mode; and a means for comparing a reference voltage corresponding to a predetermined amount of displacement of the imaging device with the representative voltage detected by the detecting means and for providing a first mode output indicating that the respective voltage is less than the reference voltage and the means for applying charging voltage to said means for displacing responding to the first mode output to apply the charging voltage to said means for displacing by applying the energy accumulated in the at least one means for storing energy to said means for displacing.

9. A digital camera capable of acquiring an image by shifting pixels, comprising:

an imaging device configured to acquire a subject image;

a piezoelectric element configured to displace said imaging device;

a detecting circuit configured to detect a representative voltage indicative of a level presently being applied to the piezoelectric element;

a switching unit configured to charge said piezoelectric element by the energy accumulated in at least one main capacitor also configured to supply energy to a strobe unit to provide strobe unit emission, and a control unit configured to control said switching unit to provide a charging operation to provide image displacement in an imaging mode of said piezoelectric element, wherein said switching unit includes a charge adjusting circuit including a comparator portion configured to compare the representative voltage on said piezoelectric element detected by the detecting circuit to a reference voltage value indicating a predetermined amount of displacement of the imaging device and when the representative voltage detected by the detecting circuit becomes lower than the reference voltage value, said adjusting circuit is configured to trigger the switching unit to charge said piezoelectric element in a state of displacing said imaging device.

10. A digital camera capable of acquiring an image by shifting pixels, comprising:

an imaging device configured to acquire a subject image;

a piezoelectric element configured to displace said imaging device;

a switching unit configured to charge said piezoelectric element by the energy accumulated in at least one main capacitor configured to supply energy to a strobe unit configured to also provide strobe unit emission, the switching unit also being configured to discharge said piezoelectric element;

a control unit configured to control said switching unit to provide a charging operation and to provide a discharging operation of said piezoelectric element, wherein said switching unit includes a charging switch circuit configured to turn on or off charging of said piezoelectric element, a discharging switch circuit configured to turn on or off discharging of said piezoelectric element, a detecting circuit configured to detect representative voltage indicative of a level of voltage presently being applied to said piezoelectric element, and a comparing circuit configured to compare the representative voltage detected by said detecting circuit and a reference voltage indicating displacement of the piezoelectric element, wherein said charging switch circuit is configured to turn on charging of said piezoelectric element based on the comparison by said comparing circuit indicating the respective voltage detected by said detecting circuit is less than the reference voltage, and said control unit is configured to control acquiring a first image in a state not displacing said imaging device, and acquiring a second image in a state of charging said piezoelectric element so as to displace said imaging device.

11. A digital camera capable of acquiring an image by shifting pixels, comprising:

an imaging device configured to acquire a subject image;

a piezoelectric element configured to displace said imaging device;

a detecting circuit configured to detect a representative voltage indicating a level of voltage presently being applied to the piezoelectric element;

a switching unit configured to charge said piezoelectric element by the energy accumulated in at least one main capacitor configured to supply energy to a strobe unit to provide strobe unit emission; and a control unit configured to control said switching unit for controlling a charging and discharging operation of said piezoelectric element, wherein said switching unit includes a comparing unit configured to compare the respective voltage detected by said detecting circuit to a reference voltage indicating displacement of the imaging device, the comparing unit being configured to provide an output during the changing operation to control the switching unit to charge said piezoelectric element by the energy accumulate in the main capacitor.

12. A digital camera capable of taking an image by shifting pixels, comprising:
- an imaging device configured to capture a subject image;
- a piezoelectric element configured to displace said imaging device;
- a switching unit configured to charge said piezoelectric element by the energy accumulated in at least one main capacitor configured to supply energy to a strobe unit to provide for strobe unit emission or to discharge said piezoelectric element; and
- a control unit configured to control said switching unit to provide a charging operation of said piezoelectric element with image device displacement in a first imaging mode or to provide a discharging operation to insure no displacement of said piezoelectric element in a second imaging mode, wherein said switching unit includes a charging switch circuit configured to turn on charging of said piezoelectric element by the energy accumulated in the at least one main capacitor during said charging operation and a detecting circuit configured to detect a respective voltage indicative of a level of voltage presently being provided to said piezoelectric element, the switching unit further including a comparing unit configured to make a comparison of the respective voltage detected by said detecting circuit and a reference voltage, said charging switch circuit configured to turn on charging of said piezoelectric element when the comparison indicates that the respective voltage detected by said detecting circuit is less than the reference voltage during the charging operation.

* * * * *